US008655587B2

(12) United States Patent
Kandal

(10) Patent No.: US 8,655,587 B2
(45) Date of Patent: Feb. 18, 2014

(54) PROCEDURE FOR DETERMINING THE PROBABILITY OF FINDING A PARKING PLACE

(71) Applicant: skobbler GmbH, Berlin (DE)

(72) Inventor: Philipp Kandal, Tettnang (DE)

(73) Assignee: skobbler GmbH, Berlin (DE)

( * ) Notice: Subject to any disclaimer, the term of this patent is extended or adjusted under 35 U.S.C. 154(b) by 0 days.

(21) Appl. No.: 13/752,678

(22) Filed: Jan. 29, 2013

(65) Prior Publication Data

US 2013/0144826 A1  Jun. 6, 2013

Related U.S. Application Data

(62) Division of application No. 13/349,100, filed on Jan. 12, 2012.

(30) Foreign Application Priority Data

Dec. 5, 2011  (EP) ..................................... 11191926

(51) Int. Cl.
*G08G 1/14* (2006.01)
(52) U.S. Cl.
USPC ....................................... 701/468; 340/932.2
(58) Field of Classification Search
USPC ....................................... 701/468; 340/932.2
See application file for complete search history.

(56) References Cited

U.S. PATENT DOCUMENTS

2007/0040701 A1* 2/2007 Browne et al. ............. 340/932.2
2008/0048885 A1* 2/2008 Quinn ........................ 340/932.2

FOREIGN PATENT DOCUMENTS

| DE | 102005022717 | 11/2006 |
|----|--------------|---------|
| EP | 1775690 | 4/2007 |
| EP | 2043071 | 4/2009 |
| WO | 2010081545 | 7/2010 |

* cited by examiner

*Primary Examiner* — Mary Cheung
*Assistant Examiner* — Yuen Wong
(74) *Attorney, Agent, or Firm* — Sand & Sebolt

(57) ABSTRACT

A procedure for determining the probability of finding a parking place within a certain period of time on a pre-set stretch of road of an area with a multiplicity of stretches of road. With this procedure, motion profiles are detected and statistically evaluated of users of radiolocation-aided, especially satellite-aided, navigation aids in the area. For each user a "parking place found" event is determined; the stretch of road in which the "parking place found" event occurred is detected; and the travel time is detected which the user expended in each of the stretches of the road until the "parking place found" event occurred. From the data thus acquired for a multiplicity of users, a probability is determined of finding a parking place within the set time span on the stretch of the road.

3 Claims, No Drawings

PROCEDURE FOR DETERMINING THE PROBABILITY OF FINDING A PARKING PLACE

CROSS-REFERENCE TO RELATED APPLICATIONS

This application is a divisional of U.S. patent application Ser. No. 13/349,100, filed Jan. 12, 2012, which application claims priority from European patent application Ser. No. 11191926.2 filed Dec. 5, 2011, the entire specifications of which are incorporated herein by reference.

BACKGROUND OF THE INVENTION

1. Technical Field

The present invention relates to a procedure for determining the probability of finding a parking place within a certain period of time on a pre-set stretch of road of an area with a multiplicity of stretches of road. It further relates to a procedure for displaying the probability, on a preset stretch of road, of finding a parking place, in a radiolocation-aided, especially satellite-aided, navigation device having digitally recorded mapping data and a display device to display the mapping data. Lastly, the invention also relates to a procedure to guide the user of a radiolocation-aided, especially satellite-aided, navigation device along a route to seek a parking place in the vicinity of a travel destination.

2. Background Information

Radiolocation navigation, especially satellite-aided location, has long been known. Especially it serves motor vehicle drivers for getting oriented along a stretch of road to a desired travel destination. Such navigation procedures are based on satellite-aided radiolocation, currently the so-called GPS system. Modern navigation devices contain digital mapping data which they consult to plan appropriate travel routes. The route typically is planned based on input of a destination address or of a target point, to which, proceeding from the current position (the starting position), the navigation device computes the optimal route.

There is a very wide variety of navigation devices. Navigation devices installed permanently in motor vehicles are known, as are mobile devices. Among mobile devices there are some that function exclusively as navigation devices. However, currently multi-function devices such as smart phones or tablet PCs enjoy great popularity, and, if equipped with appropriate applications software with a navigation function, can thus be used as navigation devices. For in many of these multi-function devices, currently satellite navigation receivers (GPS receivers) are already installed, by which these devices have available the hardware prerequisites for use as a navigation device. Certain manufacturers have reached a level of specialization such that they offer applications software for such devices that make available digital mapping data, route computation routines and other functions of a navigation device and thus upgrade the mobile terminal to a navigation device.

Along with mere route guidance from a starting point to a destination, modern navigation devices also offer additional functions such as making available information about points of interest (POI), such as places worth visiting, museums, public parks and the like. Dynamic route guidance is also known, in which traffic situations along the planned route and stretch of road are allowed for, such as traffic tie-ups. Information about such tie-ups are received by navigation devices in part via appropriately encoded signals transmitted from radio stations with traffic information or through evaluations of movement data from other users of such navigation devices. If the motion of users is significantly slowed, especially if it comes to a halt, then the manufacturer of a navigation device who queries its users about this motion profile concludes that a tie-up or halt has occurred in the vicinity of this section of road in which a change has occurred in the motion profile of its users, and issues a tie-up message to that effect to the navigation device.

All of these functions described serve to guide a user from a starting point to a destination.

It is known that a large part of a vehicle's traveling time is expended in seeking for a parking place at his destination. In large cities, most vehicle drivers park their vehicles at the side of the street, and thus once they have reached their destination they circle around the destination without guidance until they have found the streetside parking place. Not only is valuable time lost, but especially when drivers repeatedly go around in circles in areas without many parking places, the result can be increased traffic, and at worst this can lead to tie-ups and gridlock.

Even now navigation devices and systems exist which offer the user an option of guided searches for a parking place. However, these navigation devices or systems are limited to guiding the user to a paid parking place such as a parking garage in which unoccupied spaces are present. In areas like inner cities or the like where such parking options exist, this type of destination guidance may make sense and be promising. In residential areas in which typically no paid parking places or parking garages are present, such a system ceases to be of use.

DETAILED DESCRIPTION OF THE INVENTION

It is here that the inventors commence with the invention and have made it their task to provide a procedure aided by a radiolocation, especially a satellite location-aided navigation system, to determine the probability of finding a parking place within a certain period of time on a pre-set stretch of road of an area with a multiplicity of stretches of road. A further aspect of the task that is the basis of the invention is to provide a procedure to display such a probability on a navigation device. Lastly, a novel procedure should also be found to guide the user of a radiolocation-aided, especially satellite-aided, navigation device during the search for a parking place.

This problem is initially solved by a procedure for determining the probability of finding a parking place within a certain period of time on a pre-set stretch of road of an area with a multiplicity of stretches of road. An additional aspect of the solution consists in a procedure for displaying the probability of finding a parking place in a certain stretch of road, on a radiolocation-aided, especially satellite-aided, navigation device having digitally stored mapping data and a display device. A final aspect for solving the named problem is to be seen in a procedure to guide a user of a navigation device that is radiolocation-aided, especially satellite-aided, along a route to search for a parking place in the vicinity of a destination.

A first aspect indicates using the invention for a procedure to determine the probability of finding a parking place within a certain period of time on a pre-set stretch of road of an area with a multiplicity of stretches of road. For this, according to the invention, the procedure has recourse to motion profiles of users of navigation devices in the area that are radiolocation-aided, especially satellite-aided. These motion profiles can be very easily acquired in that for example a certain navigation device is identified based on the network name of its radio receiver or also if the device is equipped with an option to connect to a radio telecommunication network it is identified via its telecommunication network name, and its position and its motion data are determined from the location from the radiolocation procedure. Since currently users in large numbers are employing radiolocation-aided navigation devices, appropriate data can be obtained in equally large numbers and distribution, so that they can be statistically evaluated. According to the invention, for each user, a "parking place found" event is determined if he has found a parking place. For example, the criteria for this can be a cessation of motion for a time that exceeds a fixed tolerance period and/or the navigation device having been positionally removed from a street. Determining a tolerance time which must be exceeded by cessation of motion makes sense, so that not every stop at a traffic light or at a barrier is assessed to be a "parking place found" event. Correspondingly, the tolerance time is to be so stipulated that it is longer than typical wait times at traffic signs and signals, such as traffic lights and stop signs or the like, as well as than typical wait times at barriers on the roadway, such as vehicles in the process of parking on the roadway, traffic calming barriers or islands, or the like. Removal of the position of the navigation device to a location off the course of the street can especially be an indication of the "parking place found" event, if the navigation device is a mobile one which the vehicle drive takes with him when leaving the vehicle, on a sidewalk in the direction of a building. Since obviously the vehicle driver is no longer driving on the street, but has left his vehicle, such an event is an indication of a "parking place found" event. Also conceivable are still other criteria, such as a typical change in motion speed that occurs when a vehicle driver leaves his vehicle and continues on foot.

If a "parking place found" event is determined, then according to the invention-specific procedure, the stretch of road on which the "parking place found" has occurred, is detected. This stretch of road is such a one which, at the time when the vehicle driver had driven over it, had exhibited at least one free parking place, namely the one which the vehicle driver had been heading for. Such a stretch of road can, for example, be a street section between two intersecting side streets. However, other divisions of such stretches of road can also be considered, such as using a certain house number of a roadside building or the like for subdividing very long stretches of roads. Lastly, according to the invention-specific procedure, the travel time which the user has used up in each stretch of road he has passed through until the "parking place found" event occurs, is detected. If a user makes more than one passage through a stretch of road on which he finally finds a parking place, then the entire travel time elapsed while making multiple passes of the stretch of road, can be determined by addition of the individual travel times and taken into account.

For the invention-specific procedure, from the data so acquired for a plurality of users, probabilities are determined of finding a parking place within the determined period of time on the stretch of road. For example, one minute can be assumed as the pre-set time period, and the figures for the users who have traveled along this stretch of road searching for parking places, are set in relation to those who within the pre-set one minute of travel time on this stretch of road have found a parking place. This relation then represents the probability. In the computation, still other criteria may be influential; for example, it is possible that those stretches of road which a user searching for a parking place has passed by, but has not found any parking place, are only to be evaluated or the travel time elapsed thereby is to be counted if they lie within a certain distance from the destination, especially closer than the stretch of road on which the user finally could find a parking place. Still further criteria could be found for a more ramified and exact analysis and determination of the probability. What is decisive here is that the invention-specific procedure is based on users of radiolocation-aided navigation systems being able to be followed in their motion profile, that corresponding data about a parking place search can automatically be acquired, and that for this no active assistance is needed from the user of the navigation system. The system is of a nature that it becomes ever more exact through constant evaluation of data over time, since the number of spot checks in the static evaluation process constantly increases. Thus, ever more exact and reliable statements can be made about the probability of finding a parking place on a preset stretch of road within a certain time period. The preset time period, which was stated above to be one minute as an example, is not fixed to this time. Shorter time spans like half a minute could just as well be selected, but so could longer time spans like about two minutes or five minutes. It could especially be considered that the preset time span is optional or that it can be dynamically adapted depending on "parking place pressure" in an area. If parking places are comparatively rare in an area, the preset time span could be set to be higher than in those areas in which parking places are available in larger numbers.

A further advantageous embodiment of the invention consists in having the day of the week and/or time of day on which or at which the "parking place found" event occurs be detected in addition to the data previously mentioned herein. For often the parking place situation in an area is strongly dependent on the time of day and also on the day of the week. In residential areas in which a large number of commuters reside, who during typical work times (such as from 8:00 a.m. to 6:00 p.m. on weekdays) have departed with their cars, at these times of day it is often much easier to find parking places than in the evening, when residents have returned from their places of work and occupy existing parking places with their vehicles. Also, in such locales the parking situation varies greatly between work days and weekends or holidays. In other locales such as inner cities, the parking place situation may be exactly the opposite. There, parking space in the peak periods of work and commerce, often between 10:00 a.m. and 6:00 p.m. may be particularly scarce, while in contrast in the evening, especially after businesses have closed, parking places are available in larger numbers. To enable these temporal dynamics to be represented in determining the probability of finding a parking place on a preset stretch of road within a certain time span, it is also advantageous to incorporate these data in acquiring the motion profiles of users. With this, the time of day and/or day of the week can be acquired as it coincides with the "parking place found" event. Naturally the acquisition of in particular the time of the day can also be linked with recognition of a parking place search—equivalent in result—thus standing in a close temporal connection with the "parking place found" event, which is not the only moment that triggers storage of the time.

Additionally, it is advantageous if, as provided according to a further advantageous additional embodiment of the invention, the motion profile of the user in the area is assessed according to the invention-specific criteria only if the user is perceived as searching for a parking place. Only if it is confirmed that a user is actually looking for a parking place can acquisition of the named data deliver the desired information. A user especially can be perceived as searching for a parking place if he is in motion in the area over a time span that is above a preset minimum time at a speed below a minimum speed. It is typical for a user in search of a parking place to travel slowly along a stretch of road while he tries to make out free parking places along the roadside. Quite often the motion then occurs only at walking speed. To distinguish here between a slow approach to a crossroads, to a red light, or the like, and travel during an effort to find a parking place, it is recommended to preset the criterion of a minimum duration of time for the slow travel. Here also, such a time will be chosen that is just above the time span typical to approach a crossroad at slow speed and the like. As a further criterion, or an alternative one, for the user of the navigation device being in search for a parking place, what can serve is detection that he has passed over a stretch of road at least for a second time. For often, searches for parking places are accompanied by multiple trips over a stretch of street or road in the hope that a parking place has been freed up in the meantime. Naturally additional criteria can be applied to make a determination that the user is involved in a search for a parking place, and thus for triggering a designation and evaluation of the motion profile.

An additional aspect of the invention is a procedure for displaying the probability of finding a parking place on a certain stretch of road, on a radiolocation-aided, especially satellite-aided, navigation device having digitally stored mapping data and a display device for displaying the mapping data. The probability data determined according to a procedure like that described above are divided according to the invention into at least two probability groups, and for each stretch of road designated on the map displayed on the display device, a graphic depiction is given of the probability group which this stretch of road is assigned to. Thus the user of the navigation device can very quickly perceive on the map depicted by his device, along which stretch of road he is more likely to find a parking place and will deliberately head for this stretch of road in the vicinity of his destination or at least first approach it when he is searching for a parking place. This display of the graphic depiction of the probability group can especially be made to depend on a choice from a corresponding menu item on the navigation aid, and does not have to be a perpetual one. Thus for example when a user has reached his destination or is approaching it, he can order a corresponding menu item on his navigation device which then, in the displayed map, graphically depicts the probability groups for finding parking places for the individual stretches of road. Depiction of these probability groups can also, however, be made to depend on a scaling of the displayed map. If an especially large and detailed display, thus a large scale, is used, then the probability groups can also be displayed. For the user of a navigation device in the vicinity of his destination, when he has switched to searching for a parking place, typically will select an especially large scale for depiction of his map.

An especially simple display, and one that is bold for the user, results when a total of three probability groups are formed, with higher-probability values in a first probability group, average-probability values in a second probability group, and lower-probability values in a third probability group. Color designations and markings can then be assigned to these three probability groups, with the first probability group obtaining a green designation, a second one yellow, and a third one a red designation. For example, those probabilities of finding a parking place within a preset time span that are above 50%, are assigned to the first probability group; probabilities that lie between 25 and 50% to the second; and below 25%, to the third group. In depicting the maps, then, for example, along the sides of the individual stretches of road on the map, green, yellow or red lines can be displayed, to make it clear what probability the user of the navigation device has of finding a parking place there in a decent amount of time.

An additional item of information can be conveyed to the user if with the procedure, no-parking information is contained in the digitally stored maps and displayed. Then in his search for a parking place, the user can from the outset avoid such stretches in which parking is not permitted.

If the display occurs when, in determining the probability, a time dependence is detected (dependence on day of the week and/or time of day), thus time-dependent, then the navigation-device user can take these dynamics into account, and it will be supplied with the pertinent information dependent on the particular time of day and/or dependent on the day of the week, which helps or aids him in his search for a parking place.

Lastly, a further aspect of the invention consists in a deliberately optimized procedure in searching for parking places to guide the user of a navigation device that is radiolocation-aided, especially satellite-aided, along a route. According to the invention, in the navigation device an endless loop route is computed along a section plan around the destination, and the user is guided along this loop until he has found a parking place. To that extent, this type of route calculation and route guidance deviates from the classic computation of route and guidance as is used to guide a user to a destination. For there a linear route guidance is done and a corresponding route calculation is undertaken that guides the user from a starting point to a destination. In searching for a parking place, however, there is no destination point that could be known. The goal is a parking place, and for the navigation system it is not evident where this is found. According to the invention, with this procedure the navigation system only recognizes probabilities of finding a parking place on a stretch of route that corresponds to a stretch of actual road, within a specified time span, and can base its route calculation on that or incorporate these probabilities. These probabilities are advantageously determined according to a procedure as per the first aspect of the invention-specific solution. However, fundamentally also another type of probability determination can be the basis for this; ultimately all that is decisive is that the navigation device or navigation system knows a corresponding probability and makes it the basis for its route computation and route guidance. The individual sequentially following sections of the route from which the navigation device assembles the endless loop, are determined by their ranking, i.e., their position in the temporal course of the route according to the criteria i) Distance of the particular stretch of road from the destination; and ii) Probability of finding a parking place on the particular stretch of road within a certain time span.

In doing so the relevance of the respective criteria i) and ii) is emphasized, based on which the individual stretches of route are stringed together to the endless loop.

This relevance emphasis can especially be done by first using and inserting stretches of the route which are in the vicinity of the destination, especially immediately adjoining it, and then more distant stretches of the route can be preferred that have a high probability of finding a parking place there within a preset time, and only after that, those in which the probability lessens. An algorithm is to be chosen for route planning that offers a compromise between travel time during the search for a parking place (thus the probability of finding a parking place on the stretch of the route) and distance from the destination (thus the walking distance to be covered finally from the parking place to the destination).

The invention claimed is:

1. A procedure for guiding a user of a navigation device that is radiolocation-aided, especially satellite-aided, along a route displayed on the navigation device for seeking parking places on a road in the vicinity of a destination, wherein, in the navigation device, a continuous-loop route is computed along a route plan about the destination by sequentially adding an additional stretch of the route to a previous stretch of the route; and the user is guided along this continuous-loop route in the navigation device until the user has found a parking place on the road, wherein the continuous-loop route and compilation of the same as stretches of the route are calculated using the criteria:

i) a distance of a particular section of the road from the destination; and ii) a probability of finding the parking place on the particular section of the road within a certain time span; and wherein, in calculating the continuous-loop route in the navigation device, the stretches of the route that are set next to each other are weighted using the relevance of the criteria i) and ii).

2. The procedure according to claim 1, wherein in calculating the stretches of the route for the continuous-loop route in the navigation device, initially stretches of route are fitted in that lie in the vicinity of the destination, then more distant stretches of route with a high probability of finding the parking place therein within the pre-set time span are fitted.

3. The procedure according to claim 1, further including detecting and statistically evaluating a motion profile of a multiplicity of users of navigation devices along roads in the vicinity of the destination; wherein the motion profile of any user is only evaluated if that user is recognized as being in search of a parking place because that user is in motion in an area for longer than a preset minimum time and at a speed that is less than a minimum speed, and/or if that user passes by any section of the road at least a second time.

* * * * *